US012618441B2

(12) United States Patent
Yagi

(10) Patent No.: US 12,618,441 B2
(45) Date of Patent: May 5, 2026

(54) CAM CLUTCH

(71) Applicant: TSUBAKIMOTO CHAIN CO., Osaka (JP)

(72) Inventor: Shotaro Yagi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 19/237,484

(22) Filed: Jun. 13, 2025

(65) Prior Publication Data

US 2025/0305545 A1      Oct. 2, 2025

Related U.S. Application Data

(63) Continuation of application No. PCT/JP2023/035190, filed on Sep. 27, 2023.

(30) Foreign Application Priority Data

Dec. 19, 2022     (JP) ................................. 2022-201875

(51) Int. Cl.
*F16D 41/08*          (2006.01)
*F16D 41/07*          (2006.01)

(52) U.S. Cl.
CPC ........... *F16D 41/084* (2013.01); *F16D 41/07* (2013.01)

(58) Field of Classification Search
CPC ............. F16D 41/06; F16D 2041/0603; F16D 41/08–41/105
See application file for complete search history.

(56) References Cited

U.S. PATENT DOCUMENTS

| | | | |
|---|---|---|---|
| 11,215,243 B2 | 1/2022 | Hodge et al. | |
| 2019/0345995 A1* | 11/2019 | Brezger | ................ F16D 41/069 |
| 2022/0056963 A1* | 2/2022 | Nakagawa | .............. F16D 41/07 |

(Continued)

FOREIGN PATENT DOCUMENTS

| | | |
|---|---|---|
| JP | 2011-231828 A | 11/2011 |
| JP | 2022-148519 A | 10/2022 |
| WO | 2022/259736 A1 | 12/2022 |

OTHER PUBLICATIONS

International Search Report dated Nov. 7, 2023, issued in counterpart International Application No. PCT/JP2023/035190. (2 pages).

(Continued)

*Primary Examiner* — Ernesto A Suarez
*Assistant Examiner* — Lillian T Nguyen
(74) *Attorney, Agent, or Firm* — WHDA, LLP

(57) ABSTRACT

The present invention aims to provide a cam clutch that enables smooth switching between operation modes while preventing the occurrence of cam engagement, and achieves noise reduction and long service life with a simple structure, without upsizing and increasing the number of components. The above problem is solved by providing a transmission member (161), which comes into contact with each of a first cam (131a) and a second cam (131b) that have different engaging directions, to be rotatable and movable in the axial direction with its rotational center fixed by a cage (140), and by configuring the transmission member (161) such that the transmission member (161) is able to tilt the first cam (131a) when rotated and is able to tilt the second cam (131b) when moved in the axial direction.

6 Claims, 9 Drawing Sheets

(56)           References Cited

U.S. PATENT DOCUMENTS

2023/0068029 A1 *   3/2023   Kusunoki  ............. F16D 41/084
2023/0140002 A1 *   5/2023   Hanawa  ................ F16D 41/076
                                                                74/337.5

OTHER PUBLICATIONS

Written Opinion of the International Searching Authority (Form PCT/ISA/237) dated Nov. 7, 2023, issued in counterpart International Application No. PCT/JP2023/035190. (3 pages).

* cited by examiner

CAM CLUTCH

TECHNICAL FIELD

The present invention relates to a cam clutch configured to be capable of switching between operation modes, for example, a bidirectional engaging mode in which torque transmission is enabled in both forward and reverse directions between an outer ring and an inner ring, a unidirectional engaging mode in which torque transmission is enabled in one of the forward and reverse directions between the outer ring and the inner ring, and a bidirectional idling mode in which the input-side rotation ring among the outer ring and the inner ring rotates idly in both the forward and reverse directions, thereby cutting off torque transmission between the outer ring and the inner ring.

BACKGROUND ART

As clutches for controlling torque transmission and cutoff, bidirectional clutches capable of switching between driving and idling in both forward and reverse directions are known.

For example, Patent Literature 1 describes a clutch configured to control a retainer that holds both a first sprag and a second sprag, which are biased by biasing means such that their rotation-locking directions are opposed to each other, thereby enabling switching between operation modes, that is, a unidirectional engaging mode in which torque transmission is enabled only in the forward direction between an outer ring and an inner ring, and a unidirectional engaging mode in which torque transmission is enabled only in the reverse direction between the outer ring and the inner ring.

CITATION LIST

Patent Literature

Patent Literature 1: Japanese Patent Application Laid-open No. 2011-231828

SUMMARY OF INVENTION

Technical Problem

Therefore, generally, in clutches that have sprags arranged symmetrically, which engage only in one rotational direction, and are configured to tilt both one and the other sprags, thereby enabling switching between operation modes, the occurrence of "engagement" in which all cams engage at the same time is likely. In other words, in such clutches, one sprag tilts to immediately start engaging with an outer ring and an inner ring when torque is applied to the outer ring or the inner ring.

When the torque is removed, the one sprag tilts in the disengaging direction and transitions into an idling state. However, during this time, the other sprag tilts in the engaging direction and starts engaging with the outer ring and the inner ring before the disengagement of the one sprag. As a result, the occurrence of "engagement" in which all cams engage at the same time is likely.

In such a state, all the sprags engage with high surface pressure. Therefore, when switching the operation modes of the clutches, a large force is required to change the posture of the sprags, damaging the engaging surfaces of the sprags against the outer ring and the inner ring, or the raceway surfaces of the outer ring and the inner ring. Consequently, the service life of the clutches may be shortened.

In order to solve this problem, the bidirectional clutch described above has the first and second sprags arranged side by side in the common retainer such that their locking directions are opposite to each other, and is configured to hold the first and second sprags in a biased state, with the first sprags biased in the anti-locking direction and the second sprags biased in the locking direction, thereby preventing the occurrence of engagement.

However, the bidirectional clutch described above is configured to control the retainer during switching between the operation modes, thereby forcibly tilting all the first and second sprags at once. Therefore, the bidirectional clutch described above cannot realize a bidirectional engaging mode in which torque transmission is enabled in both the forward and reverse directions between the outer ring and the inner ring, and a bidirectional idling mode in which the input-side rotation ring among the outer ring and the inner ring is rotated idly in both the forward and reverse directions, thereby cutting off torque transmission between the outer ring and the inner ring. Furthermore, since slip torque occurs when any one of the first and second sprags comes into contact with the inner ring and the outer ring during idling, torque during the idling increases. Moreover, due to a configuration in which the retainer is controlled by applying a load from a load applying unit to the retainer via a gear mechanism, the torque during idling also increases since the gears linked to the retainer act as rotational resistance.

The present invention has been made in view of the above circumstances and aims to provide a cam clutch that enables smooth switching between operation modes while preventing the occurrence of cam engagement, and achieves noise reduction and long service life with a simple structure, without upsizing and increasing the number of components.

Solution to Problem

In order to solve the above problem, the present invention provides a cam clutch including: an outer ring and an inner ring that are provided to be rotatable relative to each other on the same axis; a plurality of cams that are arranged between the outer ring and the inner ring; and a cage that holds the plurality of cams in a circumferential direction, wherein the plurality of cams include a first cam and a second cam that have different engaging directions relative to the outer ring and the inner ring, and are arranged such that the first cam and the second cam form a pair, a transmission member that comes into contact with each of the paired first and second cams and is provided to be rotatable and movable in an axial direction with a rotational center thereof fixed by the cage is provided, and the transmission member is configured to be able to tilt the first cam between an engaging standby state and a state in which the first cam is not in contact with the outer ring or the inner ring when rotated, and is configured to be able to tilt the second cam between an engaging standby state and a state in which the second cam is not in contact with the outer ring or the inner ring when moved in the axial direction.

Advantageous Effects of Invention

According to the invention of claim 1, the tilting of the first cam and the second cam is performed independently through the different operations of the transmission member. As a result, the operation mode of the cam clutch can be configured to be switchable between three operation modes, that is, a bidirectional engaging mode, a unidirectional engaging mode, and a bidirectional idling mode with a simple configuration. Moreover, during the switching of the operation mode between the bidirectional engaging mode and the bidirectional idling mode, the tilting of the first cam and the second cam is performed stepwise, thereby reducing the number of the cams rotated at the same timing. As a result, since the torque required to disengage the cams during the application of torque can be reduced, it becomes possible to achieve smooth operation. In addition, the engaging surfaces of the cams, as well as the raceway surfaces of the outer ring and the inner ring, are less likely to be damaged, thereby making it possible to achieve long service life. Furthermore, the tilting of the first cam is performed by rotating the transmission member, while only the tilting of the second cam is performed by the axial movement of the transmission member. Therefore, compared to a configuration in which the tilting of the cams is performed only by the axial movement of operation mode switching means, the axial movable range of the transmission member can be reduced, thereby making it possible to prevent an increase in axial dimension.

Furthermore, when the operation mode is set to the bidirectional idling mode, all the cams are not in contact with the outer ring or the inner ring, thereby preventing the occurrence of slip torque during idling. In this regard as well, the engaging surfaces of the cams, as well as the raceway surfaces of the outer ring and the inner ring, are less likely to be damaged, thereby making it possible to achieve long service life and reduce noise.

According to the invention of claim 2, in conjunction with the first cam that tilts to engage with the outer ring and the inner ring when torque is applied to the outer ring or the inner ring, the second cam, which would normally remain in the engaging standby state, is caused to tilt in a disengaging direction, while the engaging surface of the second cam is caused to separate from the raceway surface of the outer ring and/or the raceway surface of the inner ring. As a result, the second cam can be prevented from engaging with the outer ring and the inner ring before the disengagement of the first cam even if the second cam tilts in the engaging direction when the torque is removed. Therefore, smooth operation can be achieved, thereby enabling high responsiveness. In addition, suppressing the occurrence of engagement eliminates the need for a large driving source to move the transmission member in the axial direction, thereby enabling energy savings and downsizing.

According to the invention of claim 3, a separate driving force to rotate the transmission member is not needed, and both the rotation and axial movement of the transmission member can be achieved by simply moving the selector in the axial direction, thereby making it possible to prevent the complexity and upsizing of the structure of the cam clutch.

According to the invention of claim 4, the transmission member is enabled to have functions for tilting the first cam and the second cam. As a result, other constituting members that contribute to the switching of the operation mode may have a simple structure. Therefore, the structure can be simplified, thereby making manufacturing easier.

According to the invention of claim 5, the mechanism for rotating and axially moving the transmission member does not act as rotational resistance, thereby making it possible to reduce torque during idling.

According to the invention of claim 6, the size of the cam clutch in the axial direction can be reduced, and the same biasing means can be used for all the cams, thereby enabling a reduction in the number of components and facilitating the simplification of the structure.

DESCRIPTION OF EMBODIMENTS

Figure 1:
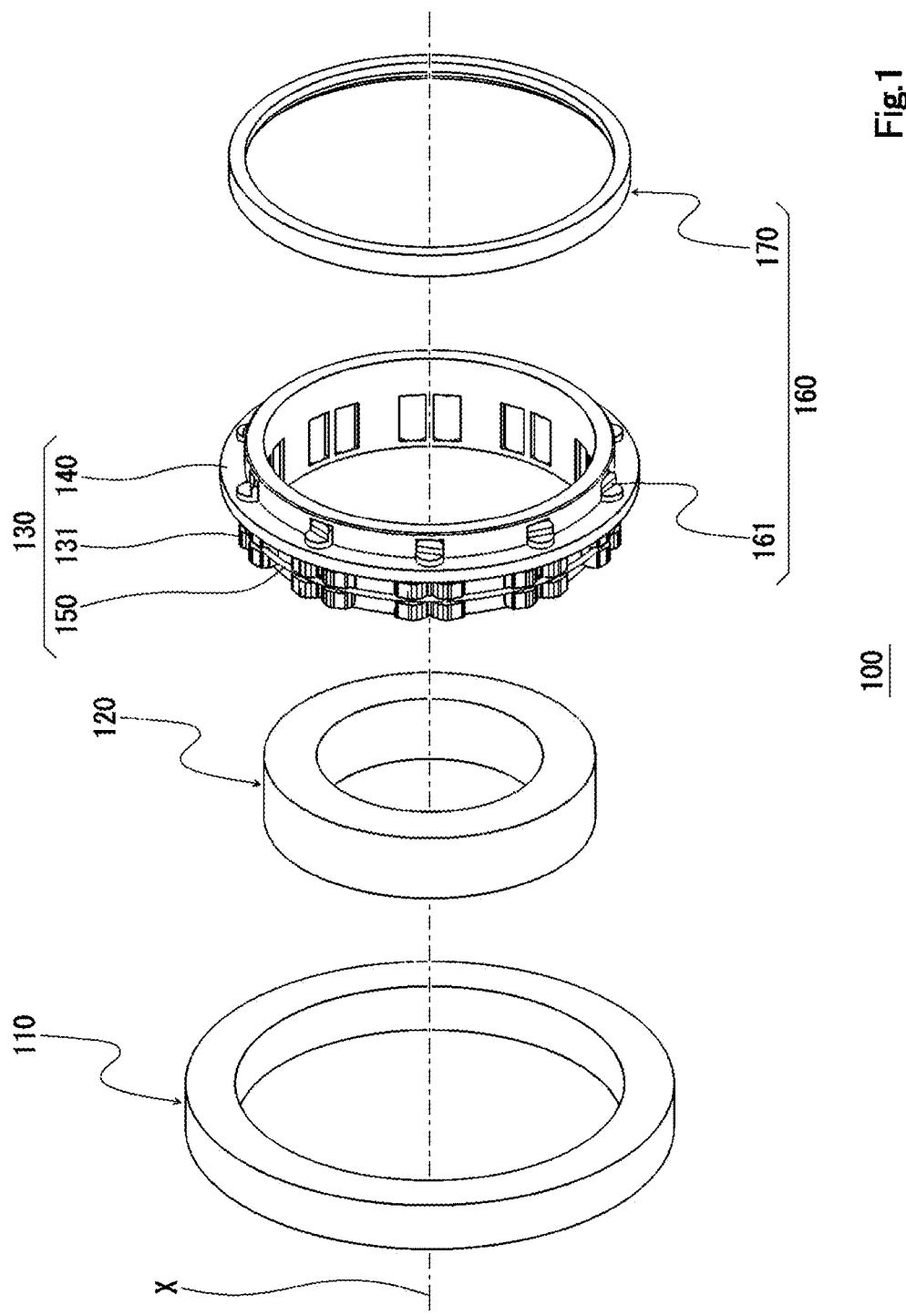
FIG. 1 is an exploded perspective view showing a configuration in an example of the cam clutch of the present invention.

As shown in FIG. 1, a cam clutch 100 of the present invention has an outer ring 110, an inner ring 120, a cam mechanism 130, and an operation mode switching mechanism 160.

Figure 2:
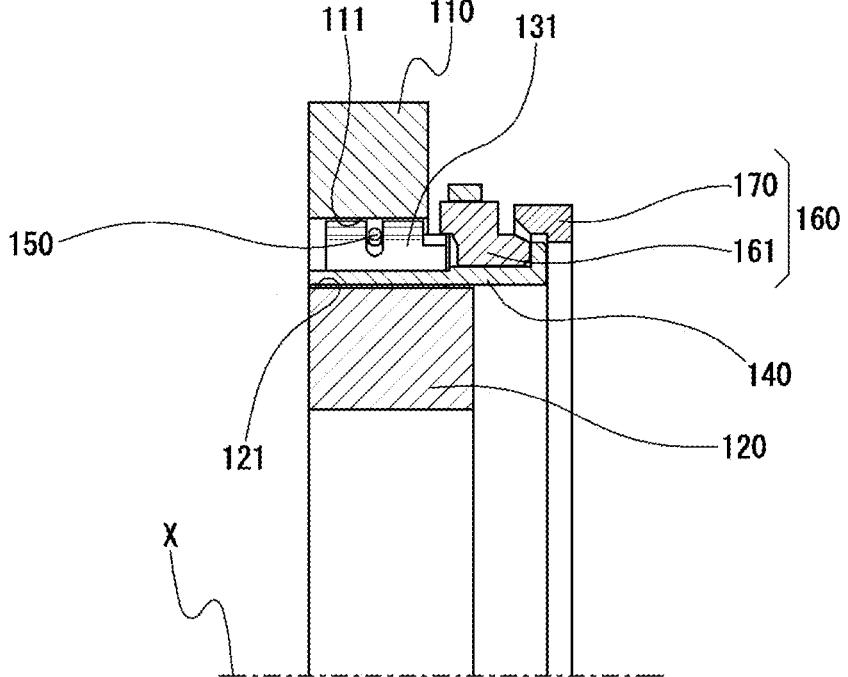
FIG. 2 is a cross-sectional view obtained by cutting along a plane parallel to the rotational axis, showing a part of the cam clutch shown in FIG. 1.
Figure 3:
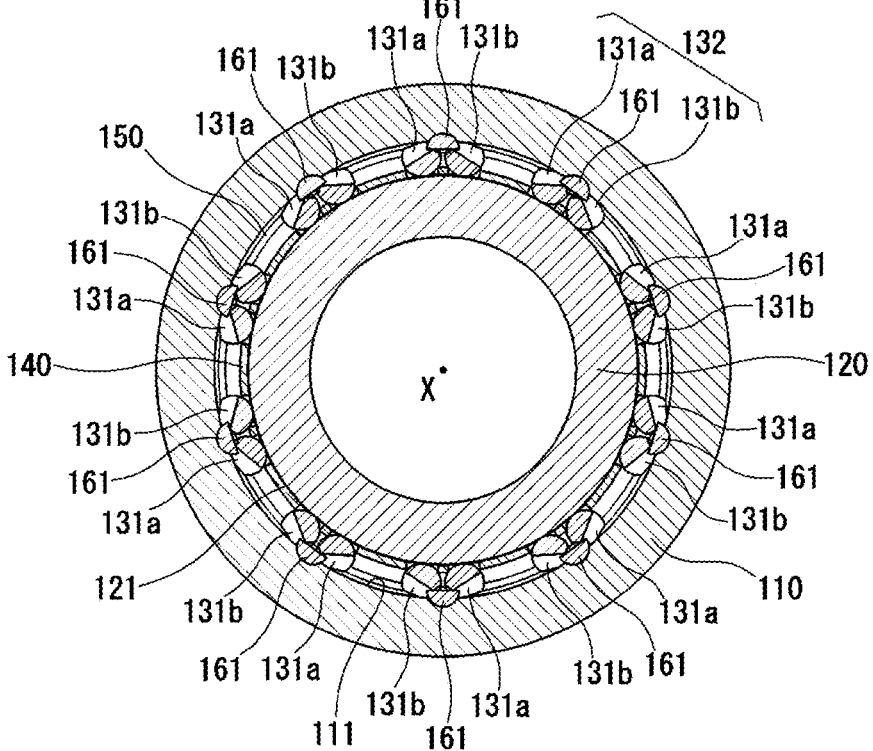
FIG. 3 is a cross-sectional view of the cam clutch shown in FIG. 1, obtained by cutting along a plane perpendicular to the rotational axis.

As shown in FIGS. 2 and 3, in the assembled state of the cam clutch 100, the outer ring 110 and the inner ring 120 are provided to be rotatable relative to each other on the same rotational axis X, and are configured such that a raceway surface 111 of the outer ring 110 and a raceway surface 121 of the inner ring 120 face each other.

As shown in FIG. 1, the cam mechanism 130 includes a plurality of cams 131, a cage 140 that holds the plurality of cams 131 at intervals in the circumferential direction, and biasing means 150 that biases each of the plurality of cams 131 in the engaging direction to contact the outer ring 110 and the inner ring 120.

As shown in FIG. 3, each of the plurality of cams 131 includes a first cam 131*a* and a second cam 131*b* that have different engaging directions relative to the outer ring 110 and the inner ring 120, with the first cam 131*a* and the second cam 131*b* forming a pair. A plurality of cam pairs 132 are arranged at specified intervals in the circumferential direction on the same circumference. Hereinafter, the first cam 131*a* and the second cam 131*b* will be simply referred to as cams 131, except when particularly mentioned separately.

The arrangement of the plurality of cams 131 on the same circumference can reduce the size of the cam clutch 100 in the axial direction and makes it possible to use the same biasing means 150 for all the cams 131, thereby enabling a reduction in the number of components and facilitating the simplification of the structure.

In this embodiment, 10 sets of the cam pairs 132 are configured to be arranged at even intervals in the circumferential direction, but the number of the cam pairs 132 is not particularly limited and can be appropriately adjusted depending on the target torque capacity. Furthermore, the intervals between the cam pairs 132 may not be even.

Figure 4:
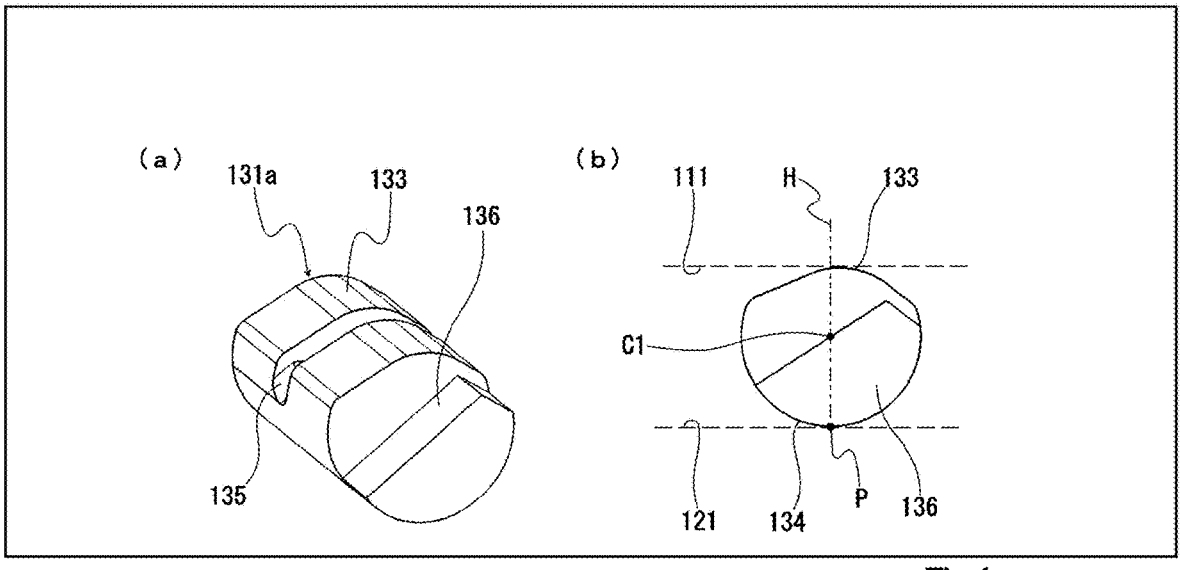
FIG. 4 shows the configuration of a first cam, where (*a*) is a perspective view and (*b*) is an end view of one end side.

As shown in FIGS. 4(*a*) and 4(*b*), the first cam 131*a* has an outer-ring-side engaging surface 133 that includes an arc-shaped portion and is formed in a curved shape and an inner-ring-side engaging surface 134 that has a larger curvature radius than the outer-ring-side engaging surface 133 and is formed in an arc shape. The first cam 131*a* is configured to engage with the outer ring 110 and the inner ring 120 when the outer ring 110 is rotated in the forward direction (counterclockwise direction in FIG. 3) or when the inner ring 120 is rotated in the reverse direction (clockwise direction in FIG. 3).

In this embodiment, for example, an annular garter spring is used as the biasing means 150, and a garter spring fitting groove 135, which extends in the circumferential direction, is formed on the outer-ring-side engaging surface 133 of the first cam 131*a*. The garter spring fitting groove 135 is configured such that, when the garter spring is fitted, a counterclockwise torque as shown in FIG. 3 is applied to the first cam 131*a*.

Furthermore, the first cam 131*a* has a step part 136 at its one end surface in the axial direction, which extends outward in the axial direction.

In this embodiment, the step part 136 is configured to form a flat shape, which is obtained by cutting out the outer-ring-side portion at one end of the first cam 131*a* using two planes that cross each other such that the apex angle becomes obtuse, and are perpendicular to the cam end surface. The apex of the step part 136 is located on the side of the outer-ring-side engaging surface 133 relative to a curvature center C1 of the inner-ring-side engaging surface 134, and is formed at a position displaced to the side (right side in FIG. 4(*b*)) where the paired second cam 131*b* is positioned, relative to a normal H at a contact P between the first cam 131*a* and the raceway surface 121 of the inner ring 120.

The second cam 131*b* is configured to engage with the outer ring 110 and the inner ring 120 when the outer ring 110 is rotated in the reverse direction or when the inner ring 120 is rotated in the forward direction.

Figure 5:
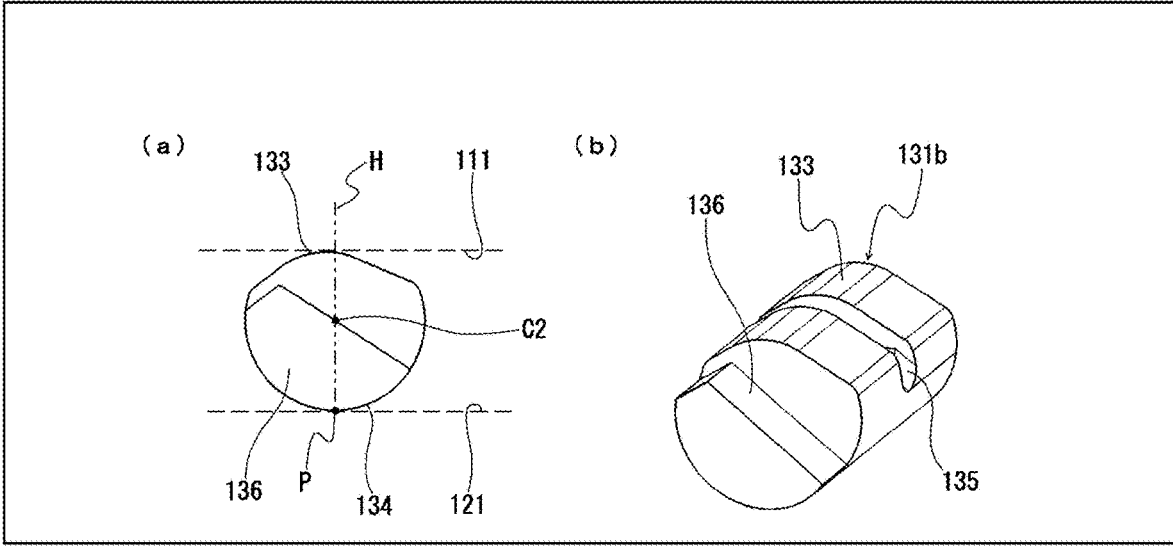
FIG. 5 shows the configuration of a second cam, where (*a*) is an end view of one end side and (*b*) is a perspective view.

As shown in FIGS. 5(*a*) and 5(*b*), the second cam 131*b* according to this embodiment has the same configuration as the first cam 131*a* and is configured to form a pair with the first cam 131*a* in an opposing arrangement. In other words, the second cam 131*b* has an outer peripheral contour shape obtained by flipping the first cam 131*a*, and the apex of a step part 136 is located on the side of the outer-ring-side engaging surface 133 relative to a curvature center C2 of the inner-ring-side engaging surface 134, and is formed at a position displaced to the side (left side in FIG. 5(*a*)) where the paired first cam 131*a* is positioned, relative to a normal H at a contact P between the second cam 131*b* and the raceway surface 121 of the inner ring 120.

A garter spring fitting groove 135 is configured such that, when the garter spring is fitted, a clockwise torque as shown in FIG. 3 is applied to the second cam 131*b*.

Figure 6:
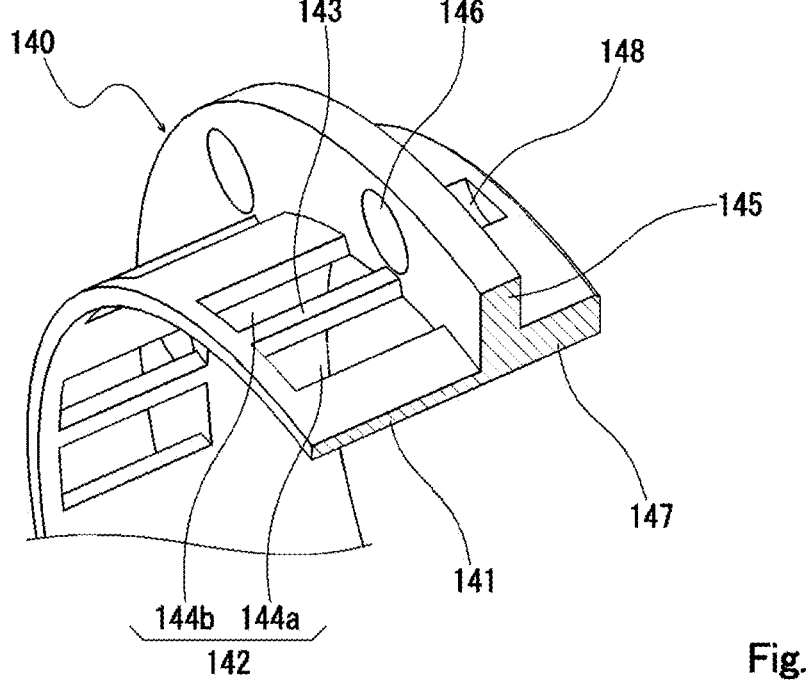
FIG. 6 is a cross-sectional perspective view of a part of a cage.

As shown in FIG. 6, the cage 140 has a small-diameter cylindrical part 141, a collar part 145 that is formed to protrude outward in the radial direction along the entire circumferential direction at one end in the axial direction of the small-diameter cylindrical part 141, and a large-diameter cylindrical part 147 that is formed at one axial end surface of the collar part 145 such that its inner peripheral surface is continuous with that of the small-diameter cylindrical part 141.

In the small-diameter cylindrical part 141, openings 142 are provided at even intervals in the circumferential direction. Each opening 142 is divided in the circumferential direction by a column part 143 that extends in the axial direction, with the space on the forward-rotation side configured as a first cam holding part 144*a* and the space on the reverse-rotation side configured as a second cam holding part 144*b*. The dimensions of the first cam holding part 144*a* and the second cam holding part 144*b* in the circumferential direction are configured to be smaller than the maximum outer diameter of the cam 131.

On the outer peripheral surface of the large-diameter cylindrical part 147, a transmission member accommodation part 148 is configured, which is a column-shaped space open outward in the radial direction. The transmission member accommodation part 148 is configured by forming a through-hole 146 that extends in the axial direction at a circumferential position corresponding to the column part 143 of each opening 142 in the collar part 145.

The first cam 131*a* and the second cam 131*b* are inserted into the corresponding first cam holding part 144*a* and second cam holding part 144*b* from the radially outer side, arranged such that the inner-ring-side engaging surfaces 134 protrude inward in the radial direction from the inner peripheral surface of the cage 140, and held by the cage 140 when the garter spring is fitted.

The cam mechanism 130 is disposed with the small-diameter cylindrical part 141 of the cage 140 inserted into the annular space between the raceway surface 111 of the outer ring 110 and the raceway surface 121 of the inner ring 120. As a result, the plurality of cams 131 are arranged in the annular space, and the cage 140 is provided to be rotatable independently of the outer ring 110 and the inner ring 120. By providing the cage 140 to be rotatable independently of the outer ring 110 and the inner ring 120, it becomes possible to reduce the torque during idling.

Therefore, the cam clutch 100 according to this embodiment includes an operation mode switching mechanism 160 that switches between three operation modes: a bidirectional engaging mode in which torque transmission is enabled in both the forward and reverse directions between the outer ring 110 and the inner ring 120; a unidirectional engaging mode in which torque transmission is enabled in one of the forward and reverse directions between the outer ring 110 and the inner ring 120; and a bidirectional idling mode in which the input-side rotation ring among the outer ring 110 and the inner ring 120 is rotated idly in both the forward and reverse directions, thereby cutting off torque transmission between the outer ring 110 and the inner ring 120.

As shown in FIGS. 1 to 3, the operation mode switching mechanism 160 has a plurality of transmission members 161 that are provided corresponding to each of the plurality of cam pairs 132 and are configured to be able to separately tilt the paired first cam 131a and second cam 131b, and a selector 170 that moves each of the plurality of transmission members 161 at once.

The transmission member 161 is configured to be able to tilt the first cam 131a between an engaging standby state and a state in which the first cam 131a is not in contact with the outer ring 110 or the inner ring 120 when rotated about an axis extending along the rotational axis X of the cam clutch 100, and is also configured to be able to tilt the second cam 131b between an engaging standby state and a state in which the second cam 131b is not in contact with the outer ring 110 or the inner ring 120 when moved in the axial direction.

Figure 7:
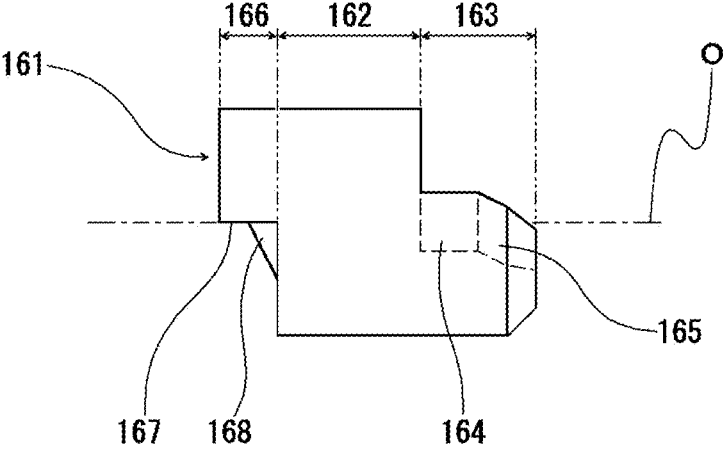
FIG. 7 is a side view of the configuration of a transmission member.

As shown in FIG. 7, the transmission member 161 according to this embodiment has a column-shaped base member part 162, a load applying part 163 that is formed to extend outward in the axial direction at one axial end of the base member part 162, and a cam contacting part 166 that is formed to extend outward in the axial direction at the other axial end of the base member part 162.

Figure 8:
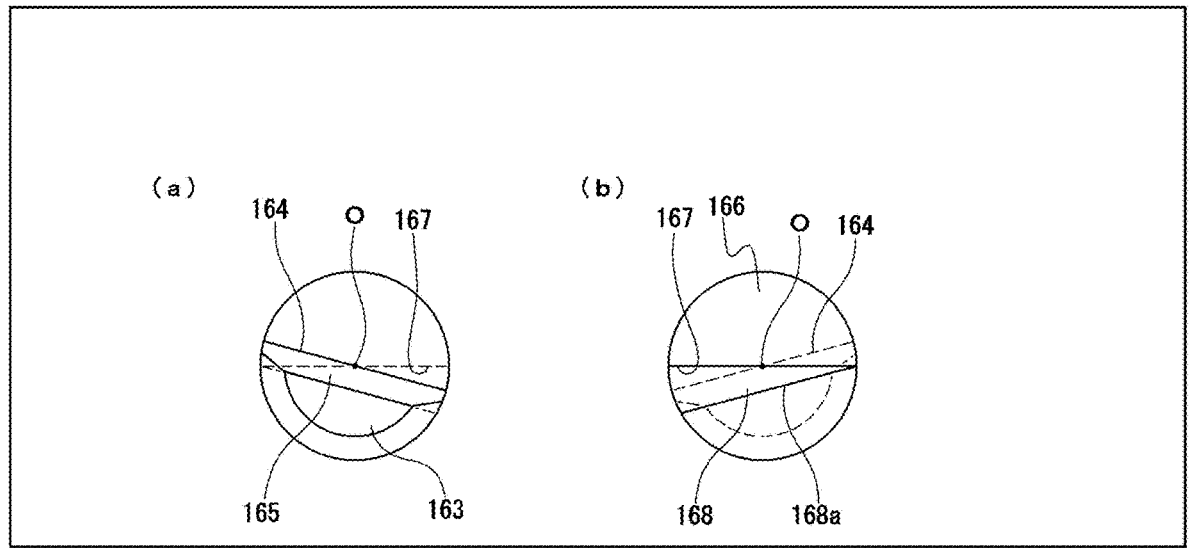
FIG. 8 shows the configuration of the transmission member shown in FIG. 7, where (*a*) is an end view of one end side and (*b*) is an end view of the other end side.

As shown also in FIG. 8(*a*), the load applying part 163 is formed to have a substantially semicircular column shape in cross-section, and has a flat rotational force acting surface 164 that is positioned, for example, on a plane perpendicular to one end surface of the base member part 162 including a central axis O, and a guide surface 165 that is continuous with the rotational force acting surface 164 and extends to tilt toward the one axial end on its outer peripheral surface side.

As shown also in FIG. 8(*b*), the cam contacting part 166 is formed to have a substantially semicircular column shape in cross-section at a position on the side opposite to the load applying part 163 across the central axis in plan view, and has a flat cam pressing surface 167 that is positioned, for example, on a plane perpendicular to the other end surface of the base member part 162 including the central axis O and is tilted in the rotational direction relative to the rotational force acting surface 164, and a cam acting surface 168 that is formed continuously with one axial end of the cam pressing surface 167 and is used to tilt the cams 131. The cam acting surface 168 is formed such that it is tilted to separate from the cam pressing surface 167 toward the one axial end, and one end edge 168a extends along the tilting direction of the rotational force acting surface 164 relative to the cam pressing surface 167.

With the above configuration, the transmission member 161 is enabled to have functions for tilting the first cam 131a and the second cam 131b, and other constituting members that contribute to the switching between the operation modes of the cam clutch 100 may have a simple structure. Therefore, the structure can be simplified, thereby making manufacturing easier.

The transmission member 161 is accommodated in the transmission member accommodation part 148 with the base member part 162 inserted into the through-hole 146 in the cage 140, and is provided to be rotatable and movable in the axial direction with the rotational center fixed by the cage 140.

The transmission member 161 is configured such that, when the operation mode of the cam clutch 100 is set to the bidirectional engaging mode, that is, when each of the first cam 131a and the second cam 131b is in the engaging standby state, the cam pressing surface 167 of the cam contacting part 166 is in contact with the step part 136 of each of the paired first cam 131a and second cam 131b, and such that the transmission member 161 is rotated in response to the tilting of the first cam 131a in the engaging direction, thereby tilting the second cam 131b in the disengaging direction. Therefore, in conjunction with the first cam 131a that tilts to engage with the outer ring 110 and the inner ring 120 when torque is applied to the outer ring 110 or the inner ring 120, the second cam 131b, which would normally remain in the engaging standby state, is tilted in the disengaging direction. As a result, the outer-ring-side engaging surface 133 of the second cam 131b can be separated from the raceway surface 111 of the outer ring 110, thereby making it possible to prevent the second cam 131b from engaging with the outer ring 110 and the inner ring 120 before the disengagement of the first cam 131a even if the second cam 131b tilts in the engaging direction when the torque is removed. Therefore, smooth operation can be achieved, thereby enabling high responsiveness. Furthermore, suppressing the occurrence of engagement eliminates the need for a large driving source to move the transmission member 161 in the axial direction, thereby enabling energy savings and downsizing.

The selector 170 according to this embodiment is configured, for example, by a ring-shaped member, and is externally fitted to the large-diameter cylindrical part 147 of the cage 140 to be movable in the axial direction.

Figure 9:
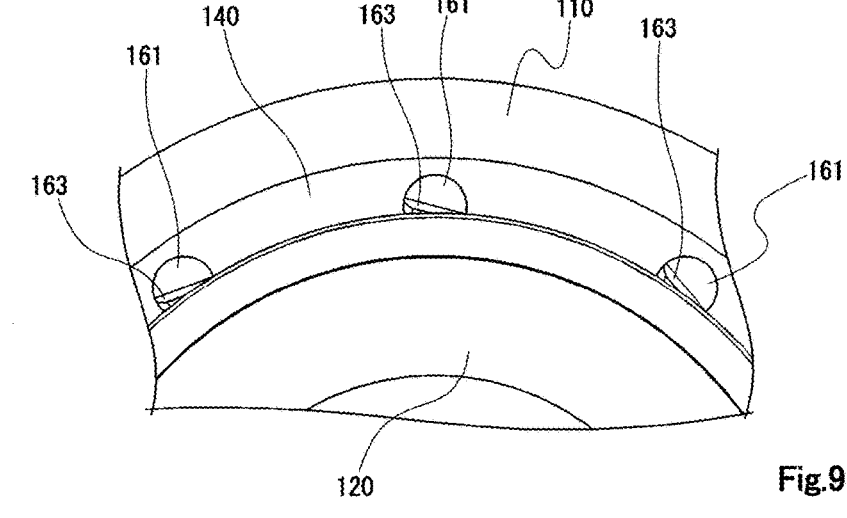
FIG. 9 is a plan view of the cam clutch shown in FIG. 1 as viewed from one end side in the axial direction, with a portion omitted.

In the cam clutch 100, when each of the first cam 131a and the second cam 131b is in the engaging standby state, the transmission member 161 is configured such that a portion of the load applying part 163 protrudes outward in the radial direction from the opening edge of the transmission member accommodation part 148 as shown in FIG. 9. Accordingly, the selector 170 is configured to rotate the transmission member 161 by engaging with the transmission member 161. This configuration eliminates the need for a separate driving force to rotate the transmission member 161. By simply moving the selector 170 in the axial direction, both the rotation and axial movement of the transmission member 161 can be achieved, making it possible to prevent the complexity and upsizing of the structure of the cam clutch 100.

The selector 170 is moved in the axial direction manually or by an actuator (not shown) or the like.

Hereinafter, the operation of the above cam clutch 100 will be described.

Figure 10:
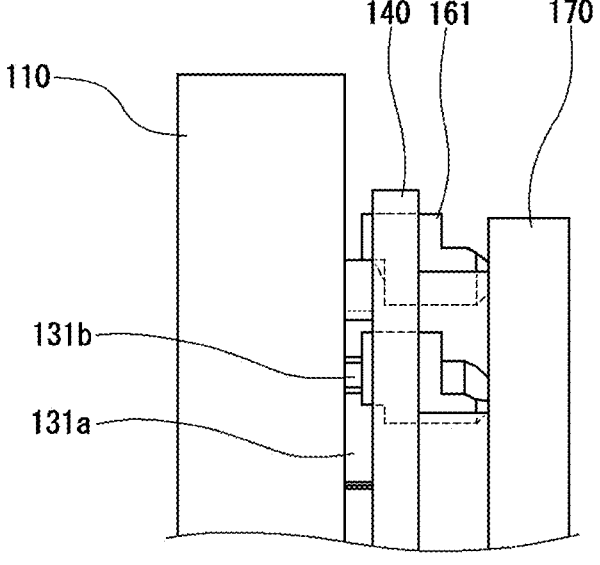
FIG. 10 is a side view schematically showing the state of the cam clutch when the operation mode of the cam clutch shown in FIG. 1 is set to a bidirectional engaging mode.

First, as shown in FIG. 10, when the selector 170 is fixed at a first fixed position and is not in contact with the transmission member 161, the first cam 131a and the second cam 131b remain in the engaging standby state to start immediate engagement with the outer ring 110 and the inner ring 120 upon the application of torque to the outer ring 110 or the inner ring 120. Accordingly, the operation mode of the cam clutch 100 is set to the bidirectional engaging mode in which torque transmission is enabled in both the forward and reverse directions between the outer ring 110 and the inner ring 120.

Figure 11A:
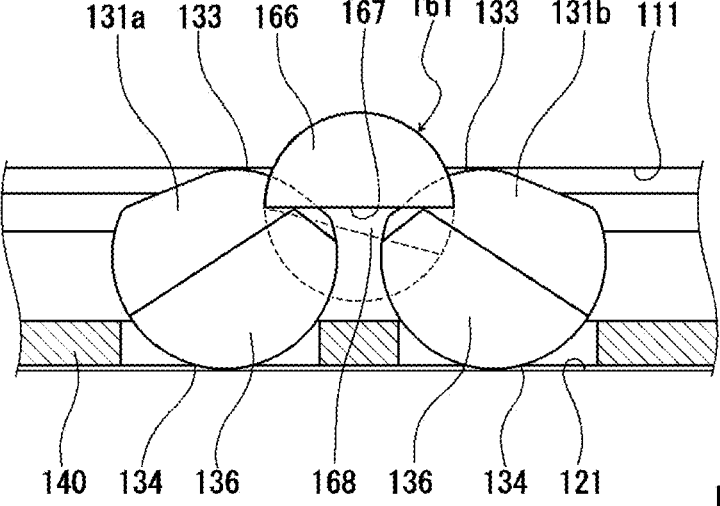
FIG. 11A is a view showing the contacting state between the cam contacting part of the transmission member and the step parts of the cams when the first cam and the second cam are in an engaging standby state under the bidirectional engaging mode.

When the first cam 131*a* and the second cam 131*b* are in the engaging standby state, the cam pressing surface 167 of the cam contacting part 166 in the transmission member 161 is in contact with both the step part 136 of the first cam 131*a* and the step part 136 of the second cam 131*b* as shown in FIG. 11A. Therefore, when the first cam 131*a* rotates to tilt in the engaging direction upon the application of torque, the transmission member 161 rotates in response to the tilting of the first cam 131*a*. As a result, the second cam 131*b* rotates to tilt in the disengaging direction, and the outer-wheel-side engaging surface 133 of the second cam 131*b* separates from the raceway surface 111 of the outer ring 110. When the torque is removed, the first cam 131*a* rotates to tilt in the disengaging direction and transitions into the engaging standby state. At this time, the second cam 131*b* rotates to tilt in the engaging direction. However, since the outer-ring-side engaging surface 133 of the second cam 131*b* has been already separated from the raceway surface 111 of the outer ring 110 during the engagement of the first cam 131*a*, the second cam 131*b* can be prevented from engaging with the outer ring 110 and the inner ring 120 before the disengagement of the first cam 131*a*.

Furthermore, the same applies when the second cam 131*b* rotates to tilt in the engaging direction. In response to the tilting of the second cam 131*b*, the transmission member 161 rotates, causing the first cam 131*a* to rotate and tilt in the disengaging direction. As a result, the outer-ring-side engaging surface 133 of the first cam 131*a* is caused to separate from the raceway surface 111 of the outer ring 110. When the torque is removed and the second cam 131*b* rotates to tilt in the disengaging direction and transitions into the engaging standby state, the first cam 131*a* can be prevented from engaging with the outer ring 110 and the inner ring 120 before the disengagement of the second cam 131*b*.

As described above, the respective rotations of the first cam 131*a* and the second cam 131*b* are coordinated by the transmission member 161, thereby enabling smooth operation without the occurrence of engagement.

Figure 11B:
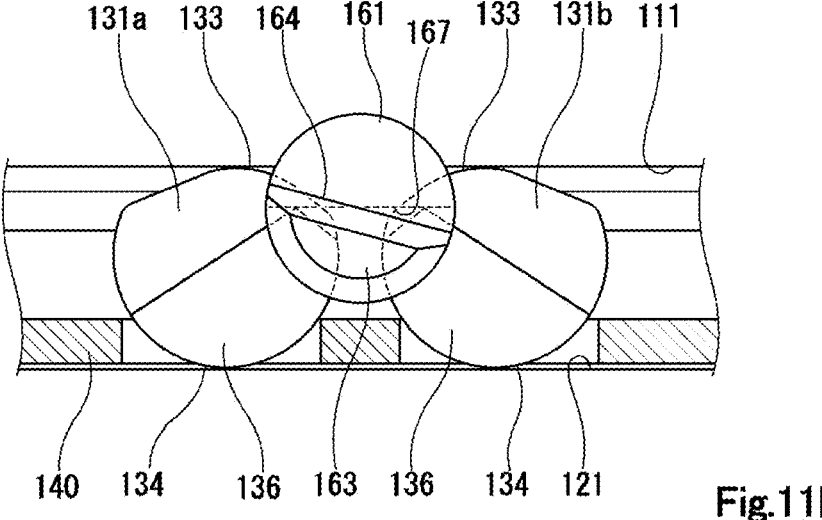
FIG. 11B is a view schematically showing the positional relationship between the cams and the transmission member as viewed from one end side in the axial direction when the first cam and the second cam are in the engaging standby state under the bidirectional engaging mode.

When the operation mode of the cam clutch 100 is set to the bidirectional engaging mode and the first cam 131*a* and the second cam 131*b* are in the engaging standby state, the rotational force acting surface 164 of the load applying part 163 in the transmission member 161 tilts in the rotational direction relative to the cam pressing surface 167 as shown in FIG. 11B, with a portion thereof protruding outward in the radial direction from the opening edge of the transmission member accommodation part 148 (see FIG. 9).

Figure 12:
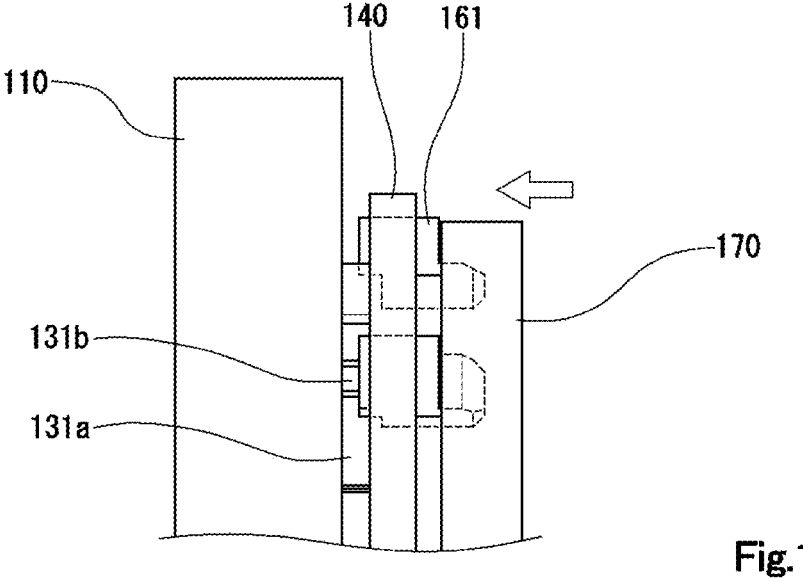
FIG. 12 is a side view schematically showing the state of the cam clutch when the operation mode of the cam clutch shown in FIG. 1 is set to a unidirectional engaging mode.
Figure 13A:
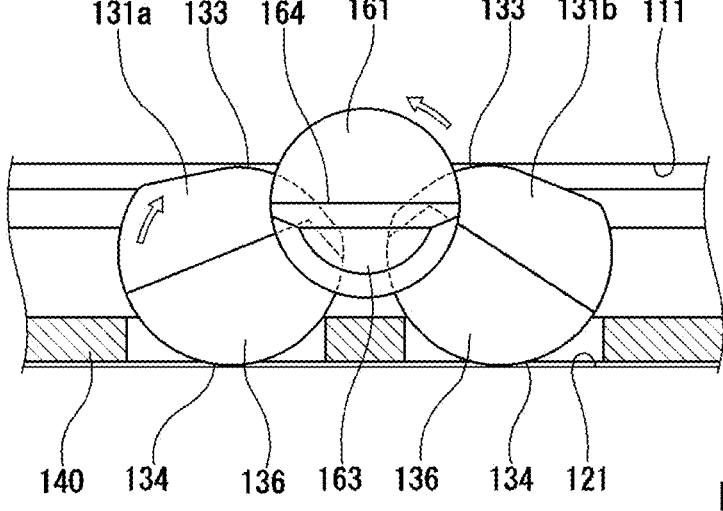
FIG. 13A is a view schematically showing the positional relationship between the cams and the transmission member as viewed from one end side in the axial direction when the second cam is in the engaging standby state under the unidirectional engaging mode.
Figure 13B:
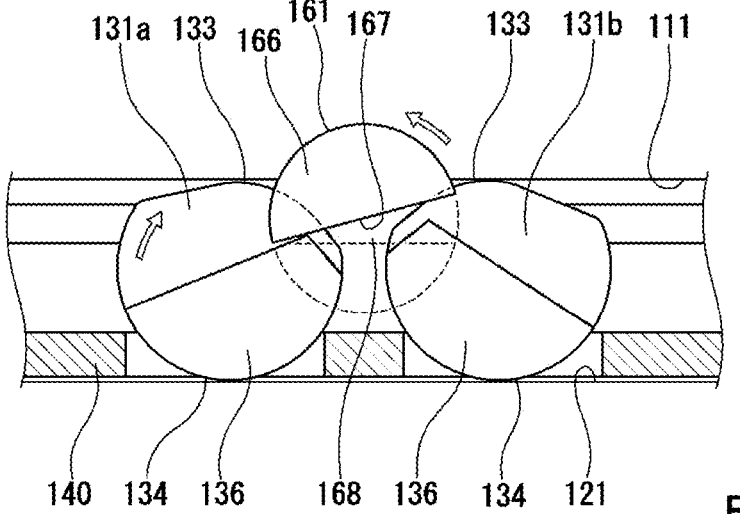
FIG. 13B is a view showing the contacting state between the cam contacting part of the transmission member and the step parts of the cams when the second cam is in the engaging standby state under the unidirectional engaging mode.

When the selector 170 is moved toward the other axial end and the selector 170 is fixed at a second fixed position as shown in FIG. 12, the selector 170 engages with the transmission member 161, thereby rotating the transmission member 161 as shown in FIG. 13A. As a result, as shown in FIG. 13B, the step part 136 of the first cam 131*a* is pressed by the cam pressing surface 167 of the cam contacting part 166 in the transmission member 161, and the first cam 131*a* is rotated to tilt in the disengaging direction. Consequently, the outer-ring-side engaging surface 133 of the first cam 131*a* is kept separated from the raceway surface 111 of the outer ring 110, and the operation mode of the cam clutch 100 is switched to the unidirectional engaging mode. In the unidirectional engaging mode according to this embodiment, the second cam 131*b* engages with the outer ring 110 and the inner ring 120, for example, when the inner ring 120 is rotated in the forward direction, thereby enabling torque transmission.

Figure 14:
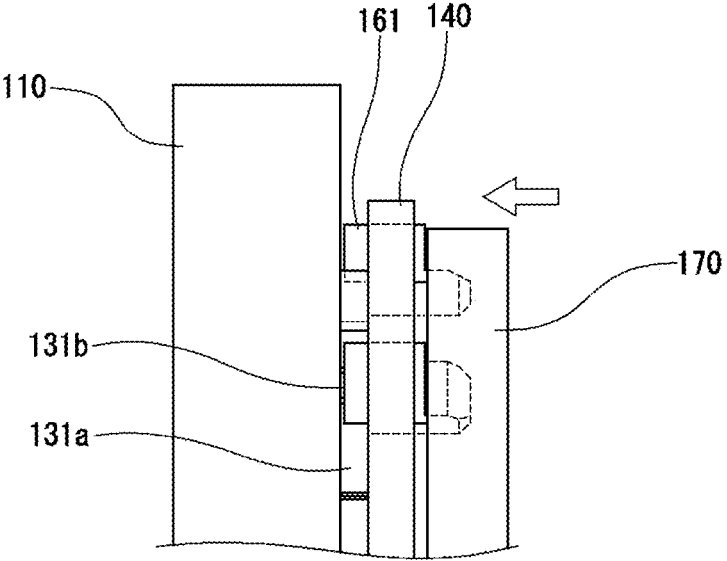
FIG. 14 is a side view schematically showing the state of the cam clutch when the operation mode of the cam clutch shown in FIG. 1 is set to a bidirectional idling mode.
Figure 15:
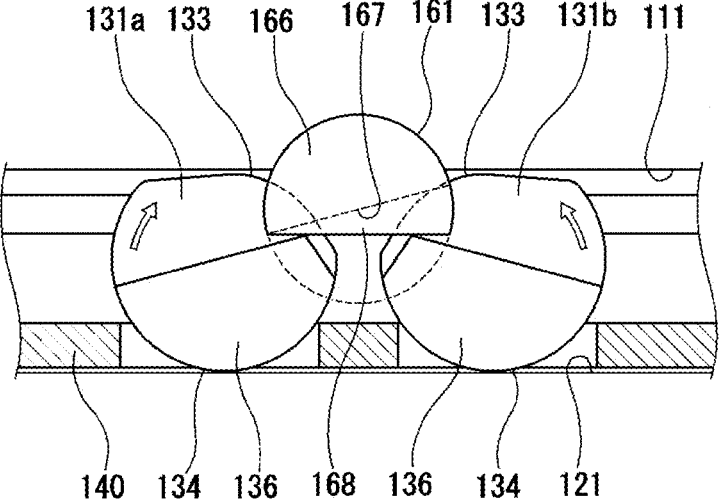
FIG. 15 is a view showing the contacting state between the cam contacting part of the transmission member and the step parts of the cams when the operation mode of the cam clutch shown in FIG. 1 is set to the bidirectional idling mode.

Furthermore, in the cam clutch 100, when the selector 170 is moved from the second fixed position toward the other axial end and fixed at a third fixed position as shown in FIG. 14, the transmission member 161 is pressed by the selector 170 and moved in the axial direction as shown in FIG. 15. Through the action of the cam acting surface 168 in the cam contacting part 166, the second cam 131*b* is rotated to tilt in the disengaging direction. Consequently, the outer-ring-side engaging surface 133 of the second cam 131*b* is kept separated from the raceway surface 111 of the outer ring 110. As for the first cam 131*a*, the outer-ring-side engaging surface 133 is kept separated from the raceway surface 111 of the outer ring 110. Consequently, the input-side rotation ring rotates idly even when rotated in either the forward or reverse direction, and the operation mode of the cam clutch 100 is switched to the bidirectional idling mode in which torque transmission is cut off between the outer ring 110 and the inner ring 120.

Therefore, according to the above cam clutch 100, the tilting of the first cam 131*a* and the second cam 131*b* is performed independently through the different operations of the transmission member 161. As a result, the operation mode of the cam clutch 100 can be configured to be switchable between the three operation modes, that is, the bidirectional engaging mode, the unidirectional engaging mode, and the bidirectional idling mode with a simple configuration.

Moreover, during the switching of the operation mode between the bidirectional engaging mode and the bidirectional idling mode, the tilting of the first cam 131*a* and the second cam 131*b* is performed stepwise, thereby reducing the number of the cams 131 rotated at the same timing. As a result, since the torque required to disengage the cams 131 during the application of torque can be reduced, it becomes possible to achieve smooth operation. In addition, the outer-ring-side engaging surface 133 and the inner-ring-side engaging surface 134 of the cams 131, as well as the raceway surfaces 111 and 121 of the outer ring 110 and the inner ring 120, are less likely to be damaged, thereby making it possible to achieve long service life.

Furthermore, the tilting of the first cam 131*a* is performed by rotating the transmission member 161, while only the tilting of the second cam 131*b* is performed by the axial movement of the transmission member 161. Therefore, compared to a configuration in which the tilting of the cams 131 is performed only by the axial movement of operation mode switching means, the axial movable range of the transmission member 161 can be reduced, thereby making it possible to prevent an increase in axial dimension.

Furthermore, when the operation mode is set to the bidirectional idling mode, all the cams 131 are not in contact with the outer ring 110 or the inner ring 120, thereby preventing the occurrence of slip torque during idling. In this regard as well, the outer-ring-side engaging surface 133 and the inner-ring-side engaging surface 134 of the cams 131, as well as the raceway surfaces 111 and 121 of the outer ring 110 and the inner ring 120, are less likely to be damaged, thereby making it possible to achieve long service life and reduce noise.

The embodiment described above details the present invention. However, the present invention is not limited to the above embodiment, and various design modifications are possible without departing from the invention described in the claims.

For example, in the above embodiment, the transmission member is configured with the load applying part in which the rotational force acting surface is formed to tilt in the rotational direction relative to the pressing surface and is configured to protrude from the opening edge of the transmission member accommodation part when the cam pressing surface is in contact with each of the first cam and the second cam. This configuration enables the transmission member to be rotated through the engagement of the selector formed as a ring-shaped member. However, the selector may be configured with a tilt surface part that rotates the transmission member when moved in the axial direction.

Furthermore, in the above embodiment, the rotational force acting surface and the cam pressing surface in the transmission member are configured as flat surfaces. However, they are not required to be flat.

Furthermore, the cams are configured with the step part at one axial end to contact the cam contacting part of the transmission member. However, for example, the cams may be configured with a pin member or the like to receive a load from the transmission member.

Furthermore, in the above embodiment, the cam positioned on the forward rotation side of the cam pair is defined as the first cam, and the cam pressing surface of the transmission member is configured to tilt relative to the rotational force acting surface such that the cam on the forward rotation side is rotated in response to the rotation of the transmission member. However, the cam positioned on the reverse rotation side of the cam pair may be defined as the first cam, and the cam pressing surface may be configured to tilt relative to the rotational force acting surface such that the cam on the reverse rotation side is rotated in response to the rotation of the transmission member. Under this configuration, when the outer ring is rotated in the forward direction, or when the inner ring is rotated in the reverse direction, the cam positioned on the forward rotation side of the cam pair engages with the outer ring and the inner ring, thereby enabling torque transmission in the opposite direction compared to the above embodiment.

Furthermore, in the above embodiment, it is described that the cams are configured to be tilted to separate from the outer ring. However, in the cam clutch of the present invention, the cams may be configured to be tilted to separate from the inner ring.

Furthermore, in the above embodiment, it is described that the biasing means is provided. However, the configuration may also be such that the biasing means is not provided. Furthermore, the biasing means is not limited to a garter spring and may be configured using elastic members such as a plurality of plate springs or torsion springs.

REFERENCE SIGNS LIST

100 Cam clutch
110 Outer ring
111 Raceway surface
120 Inner ring
121 Raceway surface
130 Cam mechanism
131 Cam
131a First cam
131b Second cam
132 Cam pair
133 Outer-ring-side engaging surface
134 Inner-ring-side engaging surface
135 Garter spring fitting groove
136 Step part 140 Cage
141 Small-diameter cylindrical part
142 Opening
143 Column part
144a First cam holding part
144b Second cam holding part
145 Collar part
146 Through-hole
147 Large-diameter cylindrical part
148 Transmission member accommodation part
150 Biasing means
160 Operation mode switching mechanism
161 Transmission member
162 Base member part
163 Load applying part
164 Rotational force acting surface
165 Guide surface
166 Cam contacting part
167 Cam pressing surface
168 Cam acting surface
168a One end edge
170 Selector

The invention claimed is:

1. A cam clutch comprising: an outer ring and an inner ring that are provided to be rotatable relative to each other on the same axis; a plurality of cams that are arranged between the outer ring and the inner ring; and a cage that holds the plurality of cams in a circumferential direction, wherein the plurality of cams include a first cam and a second cam that have different engaging directions relative to the outer ring and the inner ring, and are arranged such that the first cam and the second cam form a pair, a transmission member that comes into contact with each of the paired first and second cams and is provided to be rotatable and movable in an axial direction with a rotational center thereof fixed by the cage is provided, and the transmission member is configured to be able to tilt the first cam between an engaging standby state and a state in which the first cam is not in contact with the outer ring or the inner ring when rotated, and is configured to be able to tilt the second cam between an engaging standby state and a state in which the second cam is not in contact with the outer ring or the inner ring when moved in the axial direction.

2. The cam clutch according to claim 1, wherein, when each of the first cam and the second cam is in the engaging standby state, the transmission member is configured to be rotated in response to tilting of the first cam in the engaging direction, thereby tilting the second cam in a disengaging direction.

3. The cam clutch according to claim 1, comprising: a selector that is provided to be movable in the axial direction relative to the cage and is used to move the transmission member, wherein the selector is configured to rotate the transmission member by engaging with the transmission member.

4. The cam clutch according to claim 1, wherein the transmission member has a column-shaped base member part, a load applying part that is provided at one axial end of the base member part, and a cam contacting part that is provided at the other axial end of the base member part, the load applying part has a rotational force acting surface, and the cam contacting part has a cam pressing surface that tilts in a rotational direction relative to the rotational force acting surface and a cam acting surface that tilts the cam, the cam acting surface tilting to separate from the cam pressing surface toward the one axial end and being formed such that one end edge extends along a tilting direction of the rotational force acting surface relative to the cam pressing surface.

5. The cam clutch according to claim 1, wherein the cage is provided to be rotatable independently of the outer ring and the inner ring.

6. The cam clutch according to claim 1, wherein the first cam and the second cam are arranged on the same circumference, and biasing means that biases the first cam and the second cam into an engaging standby state is further provided.

\* \* \* \* \*